United States Patent
Kangas et al.

(10) Patent No.: US 9,332,502 B2
(45) Date of Patent: May 3, 2016

(54) CHANNEL ESTIMATION IN WIRELESS COMMUNICATION SYSTEMS

(75) Inventors: Ari Kangas, Lidingö (SE); Anders Lamm, Mölndal (SE); Torbjörn Wigren, Uppsala (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 179 days.

(21) Appl. No.: 13/985,007

(22) PCT Filed: Mar. 1, 2011

(86) PCT No.: PCT/SE2011/050231
§ 371 (c)(1),
(2), (4) Date: Aug. 12, 2013

(87) PCT Pub. No.: WO2012/118415
PCT Pub. Date: Sep. 7, 2012

(65) Prior Publication Data
US 2013/0315216 A1    Nov. 28, 2013

(51) Int. Cl.
| H04W 52/22 | (2009.01) |
| H04W 52/14 | (2009.01) |
| H04B 1/711 | (2011.01) |
| H04L 25/02 | (2006.01) |
| H04B 17/391 | (2015.01) |

(52) U.S. Cl.
CPC ............ H04W 52/146 (2013.01); H04B 1/711 (2013.01); H04B 17/391 (2015.01); H04L 25/0204 (2013.01); H04L 25/0224 (2013.01); H04W 52/221 (2013.01); H04W 52/225 (2013.01)

(58) Field of Classification Search
None
See application file for complete search history.

(56) References Cited

U.S. PATENT DOCUMENTS 5,581,580 A  * 12/1996  Lindbom et al. .............. 375/340
6,493,541 B1 * 12/2002  Gunnarsson et al. .......... 455/69
(Continued)

FOREIGN PATENT DOCUMENTS

| WO | 9428661 A1 | 12/1994 |
| WO | 9823044 A2 | 5/1998 |

(Continued)

OTHER PUBLICATIONS

International Search Report dated Nov. 25, 2011 for International Application No. PCT/SE2011/050231, International Filing Date.: Mar. 1, 2011 consisting of 11-pages.
(Continued)

Primary Examiner — Gregory Sefcheck
Assistant Examiner — Rina Pancholi
(74) Attorney, Agent, or Firm — Patents on Demand, P.A.; Brian K. Buchheit; Scott M. Garrett (57) ABSTRACT

A method for uplink channel estimation comprises providing of a channel state model in a channel estimator. An uplink radio signal of a present time slot is obtained in the channel estimator as well as a series of transmit power control commands issued for controlling a transmit power of the uplink radio signal. A delay between the time a transmit power control command is issued and the time that the transmit power control command is applied is estimated based on measurements of the particular received uplink radio signal. Channel states are adapted based on a transmit power control command compatible with the estimated delay. After the adaptation, channel states of the present time slot are estimated in the channel estimator, by tracking the demodulated uplink radio signal with the channel state model. A channel estimator performing such method is also described.

18 Claims, 6 Drawing Sheets

(56) References Cited

U.S. PATENT DOCUMENTS

| | | | | |
|---|---|---|---|---|
| 2003/0022685 | A1* | 1/2003 | Nilsson | H04B 17/336 455/522 |
| 2003/0092447 | A1* | 5/2003 | Bottomley | H04B 7/0848 455/453 |
| 2004/0087328 | A1* | 5/2004 | Ronkainen | H04W 52/221 455/522 |
| 2006/0252447 | A1* | 11/2006 | Muharemovic et al. | 455/522 |
| 2006/0262840 | A1* | 11/2006 | Wang et al. | 375/221 |
| 2009/0111409 | A1* | 4/2009 | Sun et al. | 455/208 |
| 2015/0126239 | A1* | 5/2015 | Kim | H04W 52/143 455/522 |

FOREIGN PATENT DOCUMENTS

| | | |
|---|---|---|
| WO | 9937068 A1 | 7/1999 |
| WO | 0103329 A1 | 1/2001 |
| WO | 2005034380 A1 | 4/2005 |
| WO | 2007114748 A1 | 10/2007 |

OTHER PUBLICATIONS

Lindbom et al., "Tracking of Time-Varying Mobile Radio Channels—Part I: The Wiener LMS Algorithm," IEEE Transactions on Communications, vol. 49(12), Dec. 2001 consisting of 11-pages.

European Supplementary Search Report and Written Opinion dated Oct. 6, 2014 for European Application Serial No. 11859901.8—1855, European Filing Date: Mar. 1, 2011 consisting of 6-pages.

Andoh et al.: "Channel Estimation Using Time Multiplexed Pilot Symbols for Coherent RAKE Combining for DS-CDMA Mobile Radio", 8th IEEE International Symposium held in Helsinki, Finland on Personal, Indoor and Mobile Radio Communications, (1997) Waves of the Year 2000, PIMRC '97, vol. 3, XP002135366, Sep. 1, 1997, pp. 954-958, consisting of 6-pages.

* cited by examiner

Fig. 7

CHANNEL ESTIMATION IN WIRELESS COMMUNICATION SYSTEMS

TECHNICAL FIELD

The present invention relates in general to methods and arrangements for channel estimation and in particular to methods and arrangements for channel estimation in communication systems applying transmit power control.

BACKGROUND

In wireless communication systems, accurate channel coefficients are needed for many purposes. Channel coefficients are e.g. used for the coherent combining weight of data received with different delays used for user and control data decoding in rake receivers. Channel coefficients are also used for Signal-to-Interference (SIR) estimation for inner loop power control as well as for load estimation. The demands to have very accurate channel estimates increase when the requests for higher data transmission rates increase.

A typical UpLink (UL) Wideband Code Division Multiple Access (WCDMA) receiver of today estimates the multipath channel properties. Delays and coefficients of each user are estimated by using known pilot bits and other information bits transmitted on a Dedicated Physical Control CHannel (DPCCH). The DPCCH channel is spread with a channelization and scrambling code. A spreading factor of 256 is commonly used. It is common to use a searcher to first identify the multipath delays that contain significant power and then despread the received signal at those delays.

The despread signals are in the following referred to as rake fingers and may typically originate from more than one antenna. A model for the despread DPCCH symbol is created. The parameters of the model are tracked by a tracker for each time slot. Changes between one slot and a following slot, e.g. according to different fading mechanisms, will thereby cause the tracker to adapt the parameters accordingly. For stationary or very slowly moving user equipments, the fading is typically small and the tracker will have a better possibility to provide very accurate estimations of the channel. In cases where tracking with an integrated random walk approach the step size can typically be decreased.

However, in WCDMA, transmit power control (TCP) is applied. This means that at each time slot, a TCP command is transmitted to a user equipment commanding the user equipment to increase or decrease the UL transmit power with a certain amount. Presently, in WCDMA, the UL transmit power is increased or decreased by 1 dB in each time slot. This change in transmit power will add to the fading of the channel, when the channel is going to be estimated.

One problem with prior art trackers is that they do not take into account the TPC commands that increase/decrease the power every slot. The drawback of this is that the tracker sees the TPC commands as part of the integrated random walk model and increases the step size. As a consequence, the tracker uses less filtering than what is possible, resulting in poorer channel estimation quality than necessary. This is especially important for stationary, high rate users where accurate channel estimation is needed and long channel averaging periods are beneficial.

SUMMARY

A general object of the present invention is to provide improved channel estimation in the presence of power transmit control. The object is achieved by methods and devices according to the independent claims. Preferred embodiments are defined in the dependent claims. In general, in a first aspect, a method for uplink channel estimation in a wireless communication system applying transmit power control comprises providing of a channel state model in a channel estimator. A measured and demodulated received uplink radio signal of a present time slot is obtained in the channel estimator. A series of transmit power control commands issued for controlling a transmit power of the uplink radio signal is obtained. A delay between the time a transmit power control command is issued and the time that the transmit power control command is applied is estimated. The delay is estimated in units of time slots. The delay estimate is based on measurements of the particular received uplink radio signal. Channel states of the channel state model are adapted based on a transmit power control command of the series of transmit power control commands compatible with the estimated delay. After the adaptation, channel states of the present time slot are estimated in the channel estimator, by tracking the demodulated uplink radio signal with the channel state model.

In a second aspect, a channel estimator comprises an input, a channel state model generator, an estimation core and a delay estimator. The input is configured for obtaining a measured and demodulated received uplink radio signal of a present time slot. The input is further configured for obtaining a series of transmit power control commands issued for controlling a transmit power of the uplink radio signal. The delay estimator is configured for estimating a delay, in units of times slots, between the time a transmit power control command is issued and the time that the transmit power control command is applied. The delay estimate is based on measurements of the particular received uplink radio signal. The channel state model generator is configured for adapting channel states of the channel state model based on a transmit power control command of the series of transmit power control commands compatible with the estimated delay. The estimator core is configured for estimating channel states of the present time slot by tracking the demodulated uplink radio signal with the channel state model. The channel estimation takes place after the adapting of the channel states of the channel state model.

In a third aspect, a base station of a wireless communication system applying transmit power control comprises a channel estimator according to the second aspect.

One advantage with the present invention is that improved channel estimation is achieved, in particular for stationary, high rate users.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
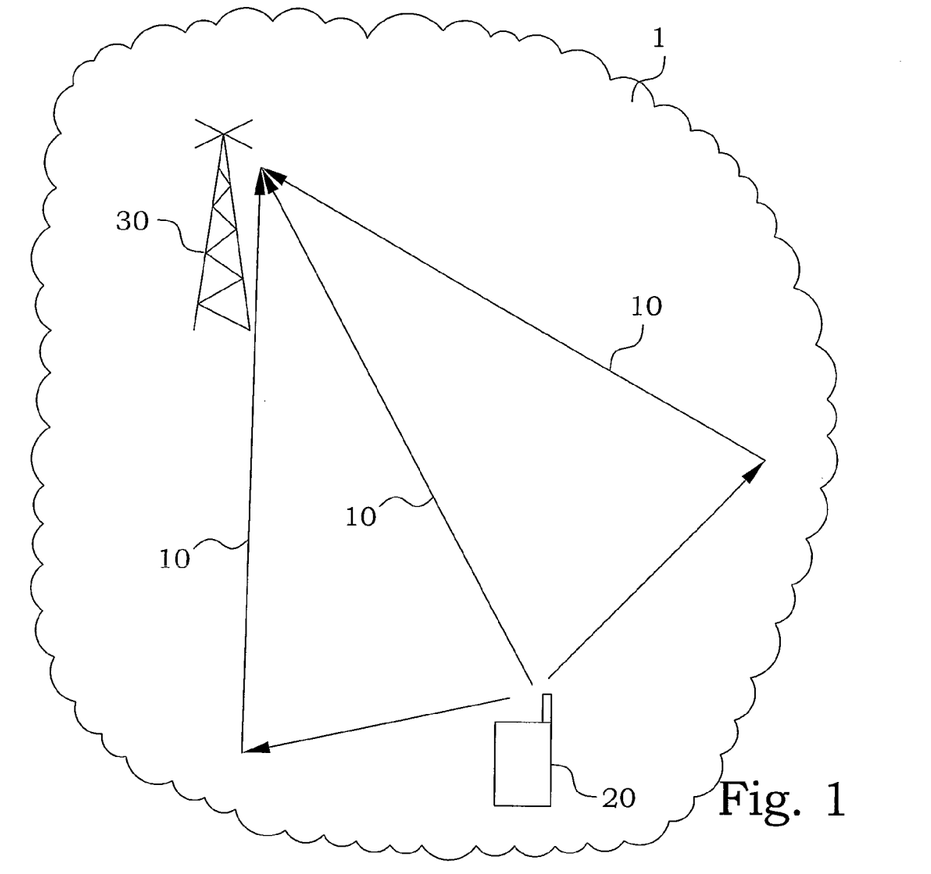
FIG. 1 is a schematic drawing of a base station and a user equipment in a wireless communication system.

FIG. 1 illustrates schematically a wireless communication system 1. A Base Station (BS) 30 communicates with one or several User Equipments (UE) 20 by radio signals. The radio signals are influenced by the surroundings. In particular, an uplink radio signal 10 can propagate in different paths to the base station. Radio propagation is therefore characterized by multiple reflections, diffraction and attenuation of the signal energy. These are caused by natural obstacles such as the landscape and buildings in the area of the transmission. Depending of the actual surroundings, different paths have different attenuation. At the base station, the signals of the different paths of the uplink radio signal 10 is summed in energy and phase and received by the base station antenna or antennas. The changes in power and phase of the radio signals are typically referred to as fading. The total influence of the surroundings on the emitted radio signal when it reaches the base station is defined as a channel. The radio signal is also typically influenced by disturbances and interferences from other sources of radio signals. In order to detect the originally transmitted information in a best possible way, a channel estimation is typically performed. In WCDMA, such channel estimation is based on known transmitted pilot symbols within the DPCCH.

In a WCDMA system using RAKE antennas, a model for the despread DPCCH symbols is generally:

$$U_{DPCCH}^p[k,s] = h^p[k,s]A[s]x[k,s] + v^p[k,s], \quad (1)$$

where, $U_{DPCCH}^p(k,s)$ is the kth despread DPCCH symbol in slot s for RAKE finger p, $h^p[k,s]$ is the channel coefficient, $x[k,s]$ is the transmitted symbol, $v^p[k,s]$ is the additional noise and interference, and $A[s]$ is the UE output amplitude in slot s.

One example of a method for channel estimation is to use a tracking of channel coefficient. In one particular approach, the tracking is done on decimated, demodulated DPCCH symbols. The decimation is done as follows.

$$U_{Decim}^p[k] = \frac{1}{2}\left(U_{DPCCH}^{dem,p}[2k] + U_{DPCCH}^{dem,p}[2k+1]\right), \quad (2)$$

$$0 \le k \le 4$$

The underlying assumption of the tracking models is that the channel behaves as an integrated random walk:

$$h^p[k] = 2h^p[k-1] - h^p[k-2] + e^p[k] \quad (3)$$

The concept defined in [1] is used. The basic equations for the tracking are:

$$\Delta^p[k] = U_{Decim}^p[k] - \hat{h}^p[k|k-1] \quad (4)$$

$$\hat{h}^p[k|k] = \hat{h}^p[k|k-1] + \mu^p[s]\Delta^p[k] \quad (5)$$

$$\hat{h}^p[k+m|k] = a_0\hat{h}^p[k+m-1|k-1] + b_1^m\hat{h}^p[k|k] + b_2^m\hat{h}^p[k-1|k-1] \quad (6)$$

$$\hat{h}^p[k-m|k] = a_0\hat{h}^p[k-m-1|k-1] + s_1^m\hat{h}^p[k|k] + \ldots + s_{m+1}^m\hat{h}^p[k-m|k-m] \quad (7)$$

where $\Delta^p[k]$ denotes the one-step prediction error for sample index k and RAKE finger p, $U_{Decim}^p[k]$ denotes one sample of a received, demodulated and decimated signal, for RAKE finger p, $\hat{h}^p[k+m|k]$ denotes the m-step ahead prediction estimate, for RAKE finger p, i.e. a channel estimate for sample k+m based on received samples up to sample k, $\hat{h}^p[k|k]$ denotes the filtered estimate, for RAKE finger p, i.e. a channel estimate for sample k based on received samples up to sample k, $\hat{h}^p[k-m|k]$ denotes the smoothed channel estimate, for RAKE finger p, at sample k-m.

An adaptive step size algorithm is used for tuning μ:

$$\mu_{state}^p[k+1] = \mu_{state}^p[k] \cdot (1 + \rho_0 \text{Sign}\{\text{Real}\{\Delta^p[k]g^p[k]\}\}) \quad (8)$$

$$g^p[k] = (1 - \mu^p[k-1])g^p[k-1] + \Delta^{p*}[k-1], \quad (9)$$

where "Sign" is defined according to below and * means complex conjugate.

$$\text{Sign}\{x\} = \begin{cases} 1 & \text{for } x \ge 0 \\ -1 & \text{for } x < 0 \end{cases} \quad (10)$$

The step size state, $\mu_{state}^p$, is updated according to (7) for each sample. After each update it is limited to the interval defined by $\mu_{min}$ (set to 0.01) and $\mu_{max}$ (set to 0.6). The value of $\mu_{state}^p$ calculated for the last sample every slot is used to update, $\mu^p$, which is the gain used during the following slot.

The filter coefficients, $a_0, b_1, b_2, s_1, \ldots, s_{m+1}$ are calculated with WLMS design equations:

$$a_0 = \alpha \quad (11)$$

$$b_1^m + b_2^m z^{-1} = \frac{Q_{-m}(z^{-1})}{\mu} \quad (12)$$

$$s_1^m + \ldots + s_{m+1}^m z^{-m} = \frac{Q_m(z^{-1})}{\mu}, \quad (13)$$

where $$D(z^{-1}) = 1 + d_1 z^{-1} + d_2 z^{-2} \quad (14)$$

$$\beta_2 = d_2(1-\mu), \ \beta_1 = d_1\frac{(1-\mu)+\beta_2}{1+\beta_2}, \ \alpha = d_1\frac{\beta_2}{1+\beta_2}, \quad (15)$$

$$Q_m(z^{-1}) = \mu[1 \ z^{-1}]\begin{bmatrix} -d_1 & 1 \\ -d_2 & 0 \end{bmatrix}^{|m|}\begin{bmatrix} 1 \\ \alpha \end{bmatrix}, m \le 0. \quad (16)$$

$$Q_m(z^{-1}) = z^{-1}Q_{m-1}(z^{-1}) + D(z^{-1})\gamma_{m-1}, m > 0, \quad (17)$$

and $$\gamma_{m-1} = \mu(1-\mu)[1 \ 0]\begin{bmatrix} -\beta_1 & 1 \\ -\beta_2 & 0 \end{bmatrix}^{(m-1)}\begin{bmatrix} -d_1 + \alpha \\ -d_2 \end{bmatrix}. \quad (18)$$

An Integrated Random Walk (IRW) model is used which means that $d_1 = -2$ and $d_2 = 1$.

Channel estimates at the decimated rate are output from the tracker as:

$$\hat{h}^p[k] = \hat{h}^p[k|k+2], 0 \le k \le 2$$

$$\hat{h}^p[3] = \hat{h}^p[3|4]$$

$$\hat{h}^p[4] = \hat{h}^p[4|4]. \quad (19)$$

A channel estimate for each DPPCH symbol interval is finally computed as:

$$\hat{h}_{DPCCH}^p[l] = \hat{h}_{DPCCH}^p[\lfloor l/2 \rfloor], l = 0, \ldots, 9 \quad (20)$$

In a wireless communication system, the channel between a user equipment and a base station is affected by fading and by interferences from other radio signals. Different user equipments within the same area may interfere with each other. If all user equipments would transmit UL signals with the same power, a user equipment being situated close to a base station will dominate over a user equipment being situated further away. This is known as the near-far problem. To handle the near-far problem, power control procedures may be implemented.

In WCDMA, the power control is divided in two main parts. In an outer loop power control a target signal-to-Interference Ratio (SIR) is adjusted to the needs of the individual radio link, e.g. defined as a certain target BLock Error Rate (BLER). In an inner loop, a fast closed-loop power control, the base station performs frequent estimates of the received SIR and compares it to the target SIR. If the measured SIR is higher than the target SIR, a power control command will be issued, instructing the user equipment to lower the transmit power. If the measured SIR is lower than the target SIR, a power control command will be issued, instructing the user equipment to increase the transmit power. This is typically performed very frequently to cope with different type of fading.

Figure 2:
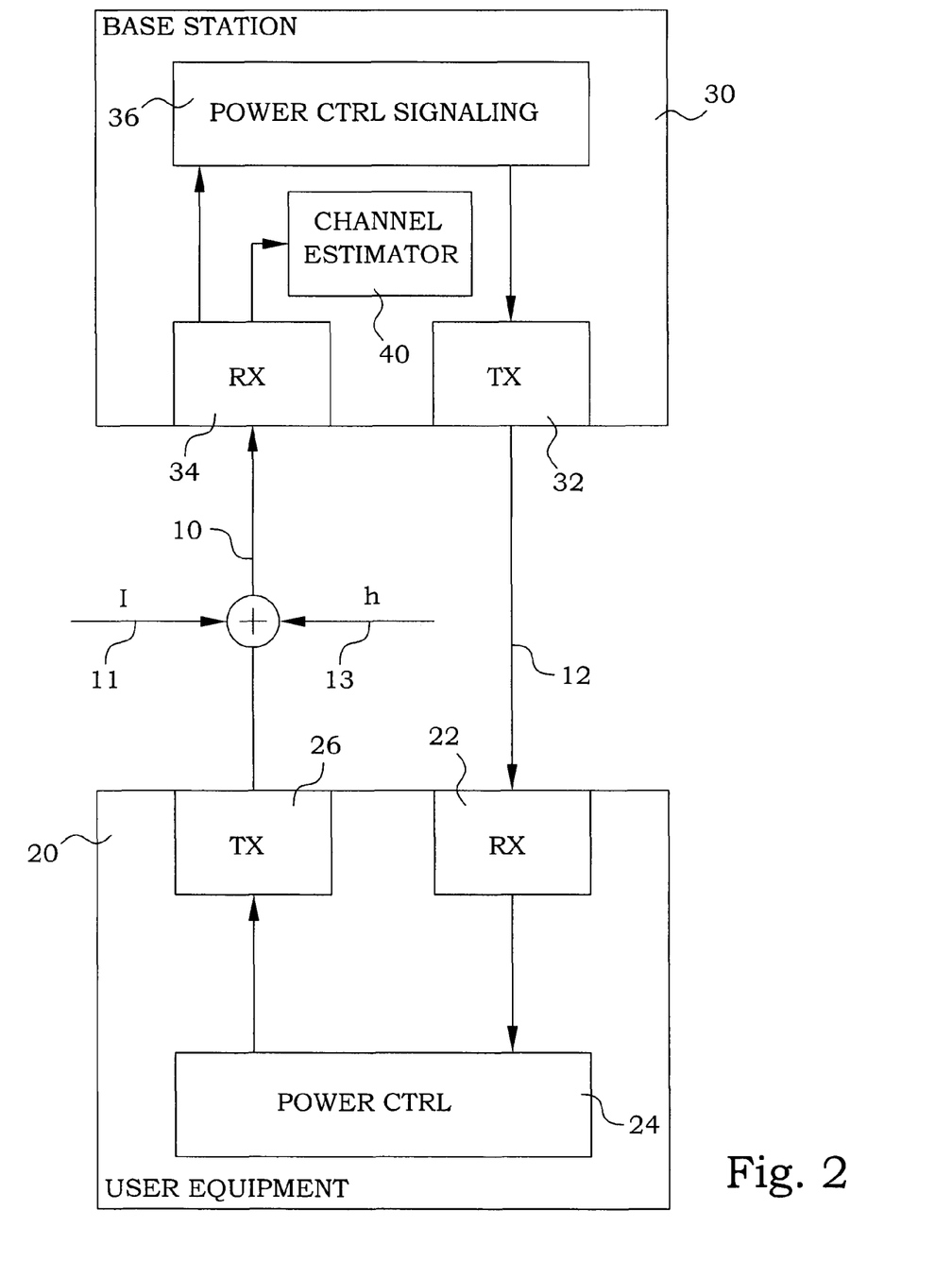
FIG. 2 is a schematic drawing of a transmit power control loop in a communication system.

FIG. 2 illustrates schematically an arrangement for a fast power control scheme. An UL radio signal 10 is transmitted from a transmitter 26 of a user equipment 20. The UL radio signal 10 is affected by the channel, h, 13 and interference from other sources, I, 11. The UL radio signal is received in a receiver 34 of a base station 30. A power control signaling unit 36 measures the SIR of the received signal and decides about which Transmit Power Control (TPC) command is going to be sent to the user equipment. In WCDMA, either an increase by 1 dB or a decrease by 1 dB is commanded. The power control signaling unit 36 provides the TPC command to a transmitter 32 of the base station and the TPC command 12 is transferred by radio control signaling to a receiver 22 of the user equipment. The TPC command is provided to a power control unit 24, and the power control unit 24 applies the new transmit power level for the transmission of the next time slot.

The UL radio signal 10 received in the base station 30 is also as mentioned above used for channel estimation purposes in a channel estimator 40. Since the transmit power affects the amplitude of the transmitted DPCCH symbols, the UE output amplitude in slot s becomes such that:

$$A[s]=A[s-1]\cdot\Delta A[s], \quad (21)$$

where $\Delta A[s]$ depends on the power command applied in slot j, such that:

$$\Delta A[s] = \begin{cases} \sqrt{10^{0.1}} & \text{if } TCP \text{ command} = \text{'up'} \\ \sqrt{10^{-0.1}} & \text{if } TPC \text{ command} = \text{'down'} \end{cases} \quad (22)$$

Slot s is generally delayed with a certain number of slots compared to slot j.

Figure 3A:
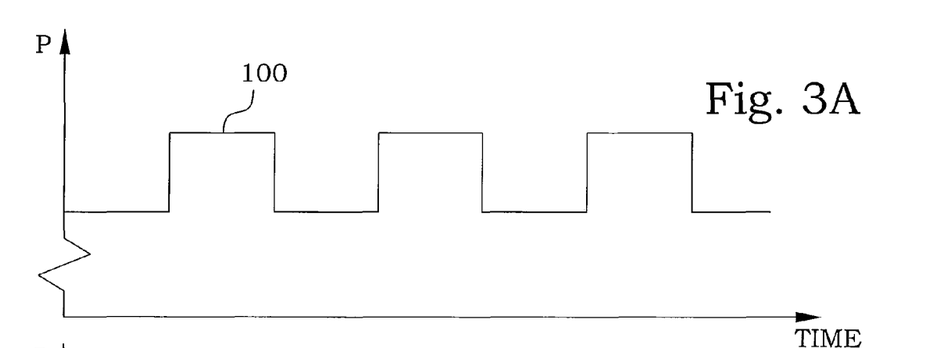
FIGS. 3A-D are diagrams illustrating fading, TPC power fluctuations and tracking of a radio signal.
Figure 3B:
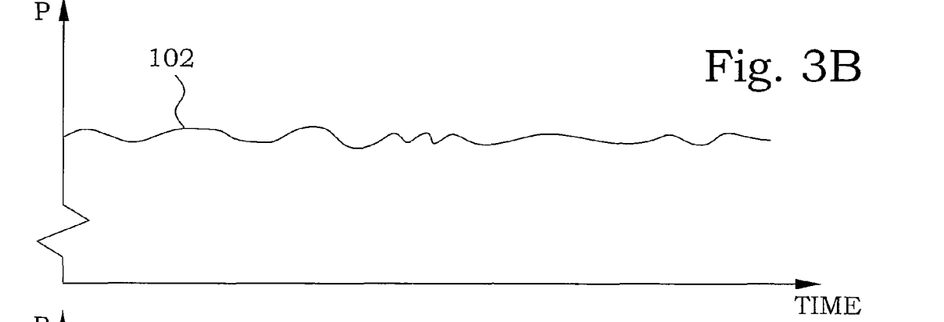
Figure 3C:
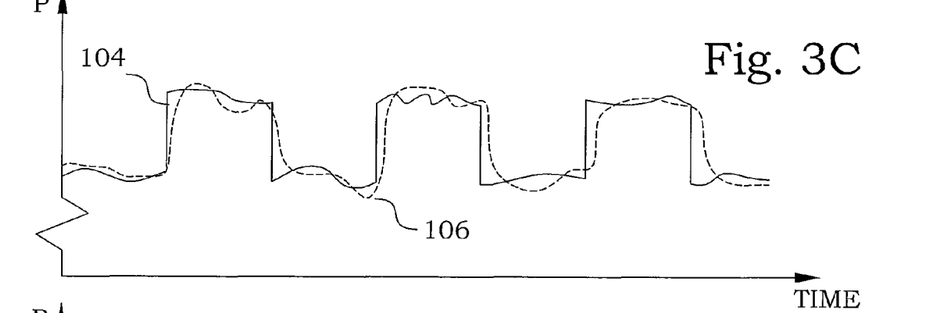

The transmit power control has effects on the channel estimation. Even if the fading conditions for a certain mobile is almost stationary, the TPC procedure will anyway change the transmit power every slot. FIG. 3A is a diagram illustrating a curve 100 representing the power changes in a received signal induced by the TPC procedure for almost stationary radio conditions. The TPC commands are here an "up" and a "down" command every second command. FIG. 3B is a diagram illustrating a curve 102 representing the possible variation due to the radio channel fading during the same time. The experienced variations in the received UL radio signal are basically the combination of these effects and can be illustrated by the curve 104 in the diagram of FIG. 3C.

When prior art tracking in the channel estimation procedures tries to follow these variations, the variation due to fading as well as the variation due to the TPC commands has to be considered. This means that every slot, a "step" in the received UL radio signal has to be tracked. In particular in cases where the fading is low, e.g. for at least temporarily stationary user equipments, such step may dominate the entire variations. Such a tracking may be illustrated e.g. as the broken curve 106 in FIG. 3C. This in turn means that the step length in the tracking routines has to be relatively large, which in turn means that the accuracy in the resulting channel estimation becomes poorer than necessary.

Figure 3D:
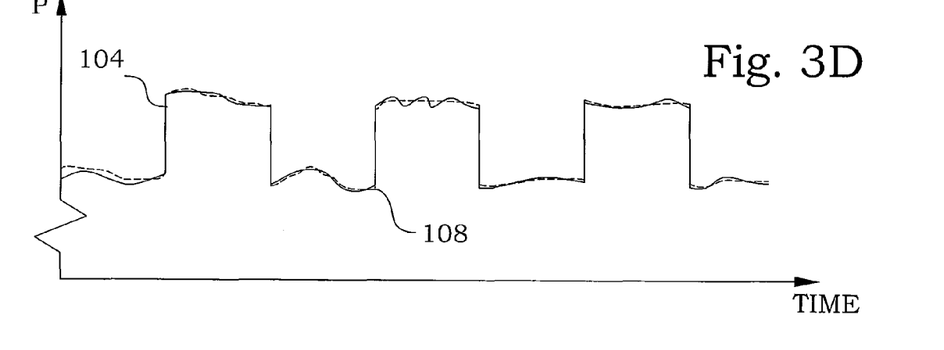

However, the TPC commands that really are the cause of the poor accuracy are known by the same node as performs the channel estimation. One piece of a solution of this problem is to compensate the tracking routines for the ordered change in transmit power. If the channel model, from which the tracking starts, is adapted to a known change in transmit power, the remaining variations are more likely to be tracked more accurately. This is schematically illustrated in FIG. 3D. The curve 108 represents the tracking. Synchronously to the changes in transmit power, the channel model for the tracking is also changed. The remaining variations are then so small that a very accurate channel estimation can be achieved.

Such adaptation is easily introduced in theory. However, in practice, new obstacles arise. It is true that the TPC commands easily can be available for the channel estimation procedure. However, what is not equally easy to provide is accurate information about which of the TPC commands that were applied in the user equipment when the radio signal under consideration was transmitted. Returning temporarily to FIG. 2, there are a number of time delays involved in the TPC scheme. When a TPC command is issued and provided for transmission from the base station, the channel estimator may be provided access to it. However, the actual transmission to the user equipment takes some time, due to the propagation time, i.e. dependent on the distance between the base station and the user equipment. When the TPC command is received in the user equipment, the command has to be decoded and interpreted in the power control unit. Also this takes some time. When the power control unit has concluded what the TPC command has ordered, the transmit power can be adapted accordingly. However, the adaptation of the transmit power is typically performed between two successive time slots. Finally, a transmitted DPCCH signal has to propagate to the base station and received, before the effect of the TPC command is seen by the base station. The shortest possible delay between the time a TPC command is issued and the time that the TPC command is applied is one time slot. However, the time delay may be longer. In many practical situations, the delay is typically two time slots, but may also be even longer. In cellular communication systems with very large cells, even the propagation time may exceed one or even several times slots.

It is thus, a priori, unknown for the base station which issued TPC command are effectuated for a certain received UL radio signal. However, such delay is vital for the possibility of adapting the channel model. If an erroneous time delay is used, the channel estimation conditions may instead be enormously deteriorated. It can therefore be assumed that past TPC commands are known. However, it also has to be assumed that the delay before the UE applies the TPC command is unknown.

These problems are solved in the following manner. The received power difference, typically in dB, between consecutive slots is measured. This sequence is correlated against the past TPC commands to find the most likely TPC delay. The so estimated TPC delay and a set of historical TPC commands are used to reconstruct the power adjustment made by the UE in the current slot. The power adjustment is used to update the tracker states before the current slot is processed.

Figure 4:
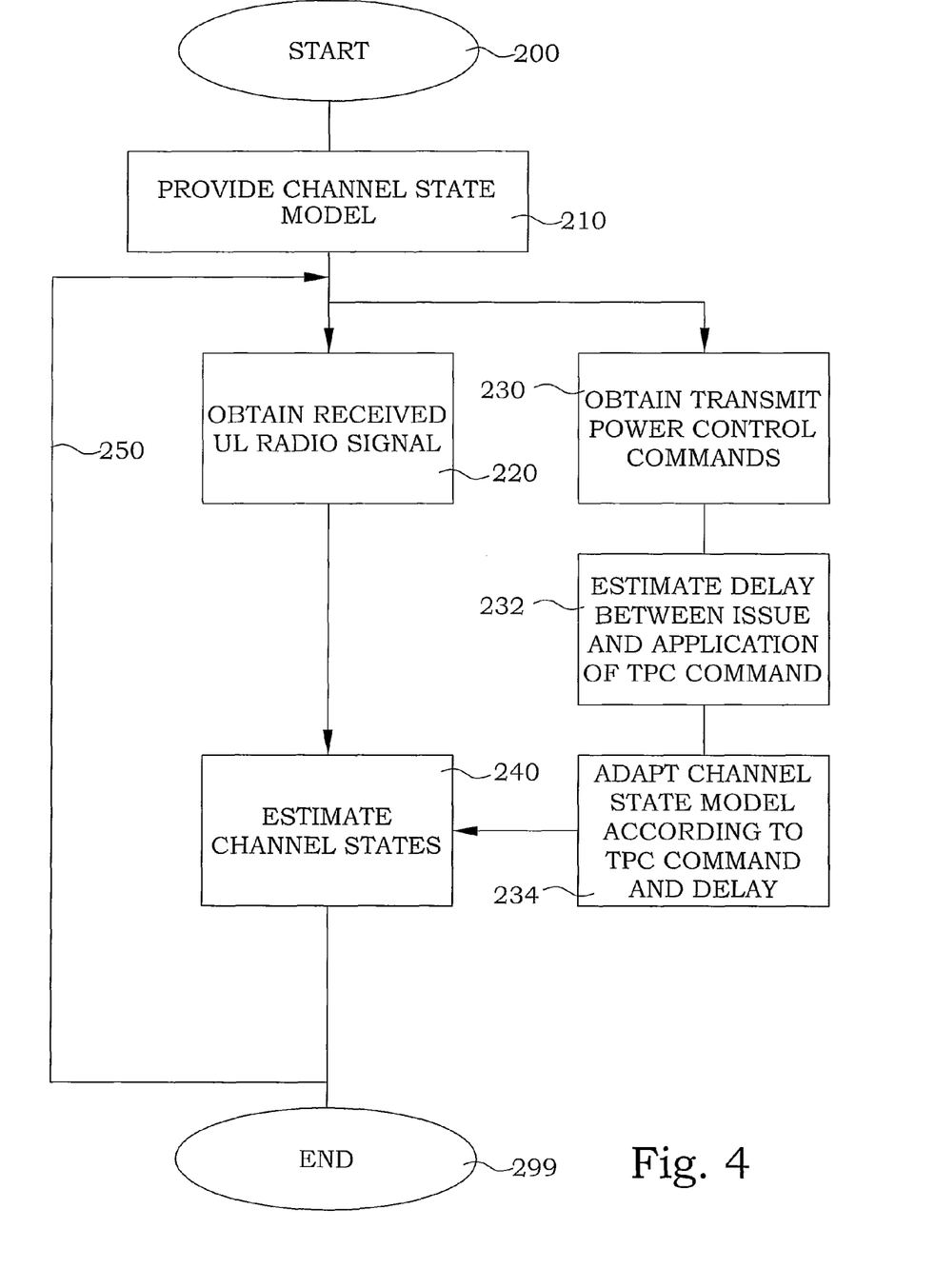
FIG. 4 illustrates a flow diagram of an embodiment of a method for channel estimation.

FIG. 4 is a flow diagram of steps of an embodiment of a method for uplink channel estimation. The method for uplink channel estimation in a wireless communication system applying transmit power control starts in step 200. In step 210, a channel state model is provided in a channel estimator. In step 220, in the channel estimator, a measured and demodulated received uplink radio signal of a present time slot is obtained. Independent thereof, in step 230, a series of transmit power control commands are obtained. The transmit power control commands are issued for controlling a transmit power of the uplink radio signal. A delay between the time a transmit power control command is issued and the time that the transmit power control command is applied is estimated in step 232. The delay is given in units of time slots. The delay is based on measurements of the particular received uplink radio signal. In one particular embodiment, the estimating comprises registration of relative powers of consecutive slots of received uplink radio signals and correlating of the relative powers to the series of transmit power control commands. In particular embodiments, the correlation can be performed for logarithmic relative powers or for linear relative powers. In another particular embodiment, the estimating comprises registration of relative powers of consecutive slots of received uplink radio signals and applying of a phase-locked loop between the relative powers and the series of transmit power control commands. Other estimation approaches are also possible. In step 234, channel states of the channel state model are adapted.

This adaptation is based on a transmit power control command of the series of transmit power control commands compatible with the estimated delay. Now the tracker states are modified to give an as good starting point as possible for the transmit power adjusted signal. After step 234 and after step 220, a step 240 is performed in the channel estimator. In step 240, channel states of the present time slot is estimated. This is performed by tracking the demodulated uplink radio signal with the channel state model. The procedure from step 220 and 230 and onwards is repeated, typically for each time slot, which is indicated by the arrow 250. The procedure ends in step 299.

One particular embodiment of a way to estimate the received energy in each slot is as follows:

$$\hat{P}[s] = \sum_{p=0}^{nrof\_fingers-1} \left| \sum_{k=0}^{9} U_{DPCCH}^p[k] \right|^2. \tag{23}$$

Then we form the relative powers between consecutive slots as:

$$\Delta P[s] = 10 \log_{10}(\hat{P}[s]/\hat{P}[s-1]). \tag{24}$$

Assume that tpc[s] is known such that:

$$tpc[s] = \begin{cases} 1 & \text{if } TCP \text{ command} = \text{'up'} \\ -1 & \text{if } TPC \text{ command} = \text{'down'} \end{cases}. \tag{25}$$

Compute the correlation between the power changes up to slot s and the TPC commands for a tentative TPC delay t as follows:

$$r[t, s] = \sum_{v=s-L+1}^{s} \Delta P[v] \cdot tpc[v - t], t = 1, \ldots, tmax. \tag{26}$$

Here L is the number of past commands that are used for the correlation and tmax is the maximum allowed UE delay. As an alternative, the correlation (26) can be computed recursively as follows:

$$r[t,s] = \alpha \cdot r[t,s-1] + (1-\alpha) \cdot \Delta P[s] \cdot tpc[v-t], \tag{27}$$

where the filter parameter α can be chosen as α≈1−1/L. An estimate of t is obtained as:

$$\hat{t} = \arg\max_t |r[t,s]|^2. \tag{28}$$

The amplitude adjustment in slot s is then estimated as:

$$\Delta A[s] = \begin{cases} \sqrt{10^{0.1}} & \text{if } tpc(s - \hat{t}) = 1 \\ \sqrt{10^{-0.1}} & \text{if } tpc(s - \hat{t}) = -1 \end{cases} \tag{29}$$

Before running the tracker, update the channel states with the estimated amplitude ΔA[s] adjustment in slot s as follows:

$$\hat{h}^p[k|k] = \Delta A[s] \hat{h}^p[k|k-1] \tag{30}$$

$$\hat{h}^p[k+m|k] = \Delta A[s] \hat{h}^p[k+m|k] \tag{31}$$

$$\hat{h}^p[k-m|k] = \Delta A[s] \hat{h}^p[k-m|k]. \tag{32}$$

The actual tracker can then operate in different ways. One choice is to use of an integrated random walk mode, and in a more particular embodiment an integrated random walk model with adaptive step length. In other words, in such embodiment, the tracker equations (4)-(10) can be used for all decimated symbols in slot s.

Alternatively, the step of estimating channel states can be performed by use of Kalman filtering techniques. Kalman filtering procedures are as such known in prior art and well known for anyone skilled in the art. Therefore, there is no further description of such procedures.

Figure 5:
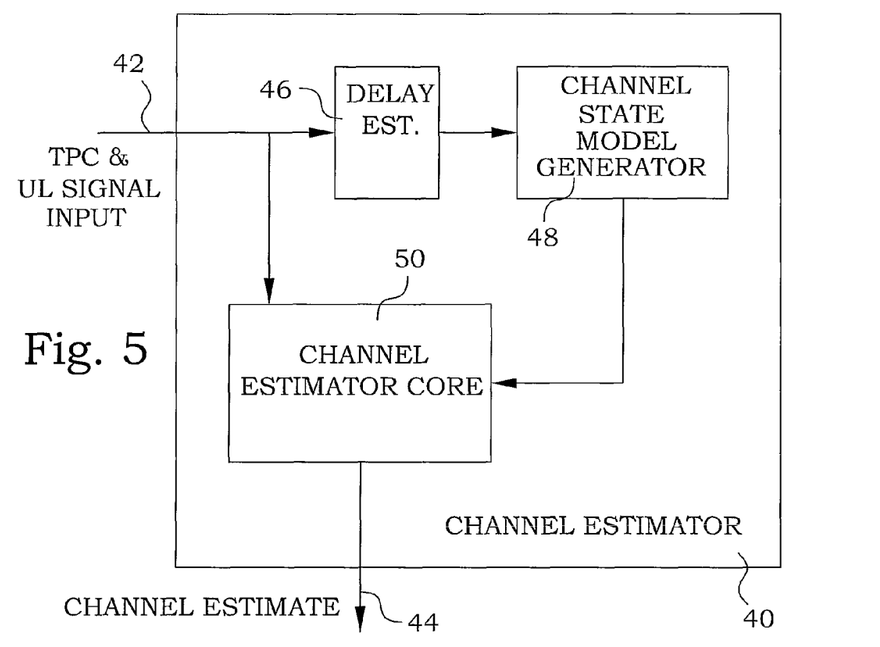
FIG. 5 illustrates a block diagram of an embodiment of a channel estimator.

The method of the present invention is typically performed in a channel estimator in a base station. FIG. 5 illustrates, by means of a block diagram, an embodiment of a channel estimator 40. The channel estimator 40 comprises a channel state model generator 48, configured for providing a channel state model to be used for the actual channel estimation. An input 42 is configured for obtaining a measured and demodulated received uplink radio signal of a present time slot. The input 42 is further configured for obtaining a series of transmit power control commands issued for controlling a transmit power of the uplink radio signal.

A delay estimator 46 is connected between the input 42 and the channel state model generator 48. The delay estimator 46 is configured for estimating a delay between the time a transmit power control command is issued and the time that the transmit power control command is applied. The delay is conveniently given in units of times slots. The delay estimate is based on measurements of the particular received uplink radio signal and on the series of transmit power control commands obtained by the input 42.

The delay estimator 46 can be configured in different manners. In one embodiment, the delay estimator 46 is configured for performing registration of relative powers of consecutive slots of received uplink radio signals and for correlating the relative powers to the series of transmit power control commands. In other words, a best possible correlation between received UL power and the issued TPC commands. In this embodiment, the correlation is performed for logarithmic relative powers. In an alternative embodiment, the correlation is performed for linear relative powers.

In another embodiment, the delay estimator 46 may be based on a phase-locked loop approach. In other words, the delay estimator is configured for performing registration of relative powers of consecutive slots of received uplink radio signals and for applying a phase-locked loop between the relative powers and the series of transmit power control commands.

The channel state model generator 48 is configured for adapting channel states of the channel state model based on a transmit power control command of the series of transmit power control commands that is compatible with the estimated delay.

The channel estimator 40 further comprises a channel estimator core 50, connected to the input 42 and the channel state model generator. The channel estimator core 50 is configured for estimating channel states of the present time slot by tracking the demodulated uplink radio signal with the channel state model. The adapting of the channel states is performed before the estimation. In other words, the channel estimator core 50 operates on an adapted set of channel states from the channel state model generator 48. In a particular embodiment, the tracking is performed by use of an integrated random walk model, and in a more particular embodiment by use of an integrated random walk model with adaptive step length. In an alternative embodiment, the estimator core is based on use of Kalman filtering techniques. The channel estimates are provided at an output 44 for to be used in other processes in the wireless communication system.

The channel estimator 40 is as mentioned above typically provided in a base station of a wireless communication system.

There are situations where it is not known what TPC command is applied, even if the series of issued TPC commands is known. When, for instance, a UE is in soft handover the UE might apply a TPC command, e.g. a down command, from another base station, so that the sequence of transmitted commands does not correspond to the sequence of applied commands. Another situation where the transmitted TPC commands do not correspond to the ones applied is when the UE is power limited.

One solution for this uncertainty is then to apply adaptation of the channel states only for TPC down-commands when the UE is in soft handover or is power limited. However, this feature is most beneficial for high rates, which typically is not achieved in soft handover. It is thus believed that this restriction in the adaptation does not limit the gains of the present invention substantially.

The performance of the proposed algorithm was evaluated using a simplified MATLAB simulator. Three different algorithms were evaluated; A tracker without TPC compensation, a tracker with TPC compensation assuming a-priori perfect knowledge of applied TPC, and a tracker with estimation of the TPC delay. The delay estimation was tested with three different sizes of the correlator window; 10, 20 and 40 slots.

Figure 6:
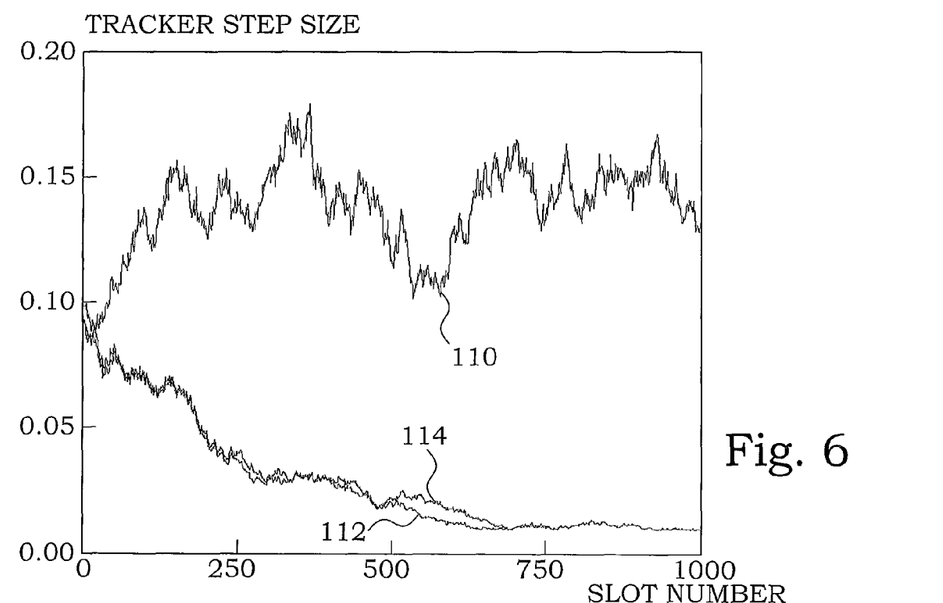
FIG. 6 is a diagram illustrating simulation results of trackers with 6 dB signal-to-noise ratio.

Simulation results performed in an Additive Gaussian White Noise (AWGN) channel with 6 dB SNR are shown in FIG. 6. It can be seen that the delay estimation works quite well. The AWGN channel is a static channel, meaning that there is no variation/fading in the channel over time. The AWGN channel is the channel where this invention has the greatest improvement potential, since the only variation in the channel is due to the transmit power changes. However, also in other types of channels, the present invention may lead to improvements. The tracker step size is an indicator of the accuracy of the channel estimation and the estimation of the delay operates well, in this case with a 40 slot correlator window.

Simulations were also performed, where it was confirmed that the channel estimation gains could be translated into a data decoding gain. It was seen in that the tracker using TPC compensation performs roughly 1.5-2 dB better than a corresponding prior art tracker at a 4% BLER level for AWGN and Pedestrian A 3 kmph (PA3) channels. The PA3 channel is characterized by 4 independently, slowly fading channel taps, but the majority of the energy is contained in the first tap, meaning that it is a fairly benign channel from an equalization perspective, and also a channel type where the benefits of the invention should be clearly visible.

In FIG. 6, curve 110 corresponds to a tracker without any TPC compensation at all, curve 112 corresponds to a tracker with TPC compensation assuming a-priori perfect knowledge of applied TPC, and curve 114 corresponds to a tracker with estimation of the TPC delay with a 40 slot correlator window. The improvements compared to prior art are huge, and the differences relative the "perfect" case are small.

Figure 7:
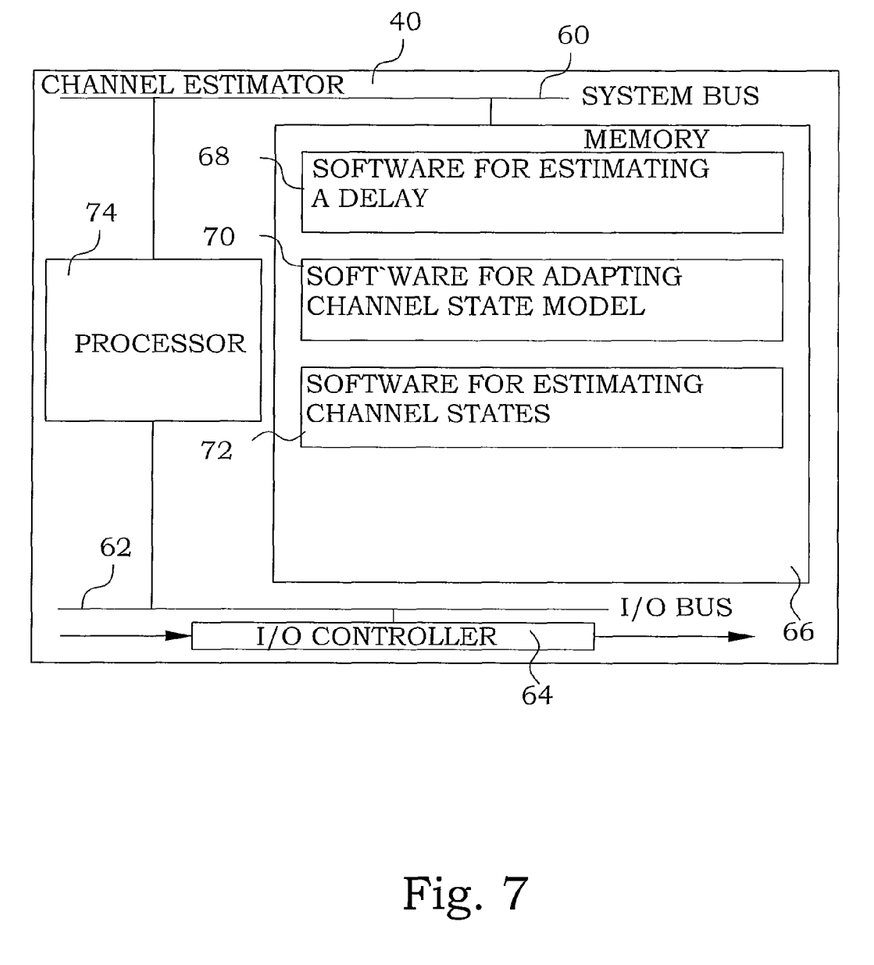
FIG. 7 is a block diagram illustrating an example embodiment of a channel estimator.

As an implementation example, FIG. 7 is a block diagram illustrating an example embodiment of a channel estimator 40. This embodiment is based on a processor 74, for example a micro processor, a memory 66, a system bus 60, an input/output (I/O) controller 64 and an I/O bus 62. In this embodiment the TPC commands and the received UL radio signals are received by the I/O controller 64 are stored in the memory 66. The processor 74 executes a software component 68 for estimating a delay, a software component 70 for adapting channel states of a channel state model and a software component 72 for estimating channel states. This software is stored in the memory 66. The processor 74 communicates with the memory 66 over the system bus 60.

Software component 68 may implement the functionality of block 46 in the embodiment of FIG. 5. Software component 70 may implement the functionality of block 48 in the embodiment of FIG. 5. Software component 72 may implement the functionality of block 50 in the embodiment of FIG. 5.

Some or all of the software components described above may be carried on a computer-readable medium, for example a CD, DVD or hard disk, and loaded into the memory for execution by the processor.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Lars Lindbom et al, "Tracking of Time-varying Mobile Radio Channels-Part I: The Wiener LMS Algorithm", IEEE Trans. Communications, Vol. 49, No 12, December 2001.

The invention claimed is:

1. A method for uplink channel estimation in a wireless communication system applying transmit power control, the method comprising:
   providing a channel state model in a channel estimator;
   obtaining, in said channel estimator, a measured and demodulated received uplink radio signal of a present time slot;
   estimating channel states of said present time slot, in said channel estimator, by tracking said demodulated uplink radio signal with said channel state model;
   obtaining a series of transmit power control commands issued for controlling a transmit power of said uplink radio signal;
   estimating a delay, in units of time slots, between a time a transmit power control command is issued by a base station and a time that the transmit power control command is applied by a user equipment, said delay being based on the measurements of said demodulated received uplink radio signal and the series of transmit power control commands, wherein estimating the delay comprises: registration of relative powers of consecutive slots of received uplink radio signals and correlating said relative powers to a series of transmit power control commands; and
   adapting channel states of said channel state model before said step of estimating channel states based on a transmit power control command of said series of transmit power control commands compatible with said estimated delay.

2. The method according to claim 1, wherein the correlating is performed for logarithmic relative powers.

3. The method according to claim 1, wherein the correlating is performed for linear relative powers.

4. The method according to claim 1, wherein estimating the delay comprises:
   applying a phase-locked loop between said relative powers and said series of transmit power control commands.

5. The method according to claim 1, wherein the tracking is performed by use of an integrated random walk model.

6. The method according to claim 5, wherein the tracking is performed by use of an integrated random walk model with adaptive step length.

7. The method according to claim 1, wherein the estimating channel states is performed by use of Kalman filtering techniques.

8. A channel estimator, comprising:
   a channel state model generator;
   an input configured to obtain a measured and demodulated received uplink radio signal of a present time slot and to obtain a series of transmit power control commands configured to control a transmit power of said uplink radio signal;
   a channel estimator core, configured to estimate channel states of said present time slot by tracking said demodulated uplink radio signal with said channel state model; and
   a delay estimator, configured to estimate a delay, in units of times slots, between the time a transmit power control command is issued via a base station and the time that the transmit power control command is applied by a user equipment, said delay estimate based on the measurements of said demodulated received uplink radio signal and on the series of transmit power control commands, wherein the delay estimator is further configured to perform registration of relative powers of consecutive slots of received uplink radio signals and to correlate said relative powers to said series of transmit power control commands;
   said channel state model generator being configured to adapt channel states of said channel state model before said estimating of channel states based on a transmit power control command of said series of transmit power control commands compatible with said estimated delay.

9. The channel estimator according to Claim 8, wherein the delay estimator is further configured to perform said correlating for logarithmic relative powers.

10. The channel estimator according to Claim 8, wherein the delay estimator is further configured to perform said correlating for linear relative powers.

11. The channel estimator according to claim 8, wherein the delay estimator is further configured to apply a phase-locked loop between said relative powers and said series of transmit power control commands.

12. The channel estimator according to claim 8, wherein the channel estimator core is further configured to perform said tracking by use of an integrated random walk model.

13. The channel estimator according to claim 12, wherein the channel estimator core is further configured to perform said tracking by use of an integrated random walk model with adaptive step length.

14. The channel estimator according to claim 8, wherein the channel estimator core is based on use of Kalman filtering techniques.

15. A base station for a wireless communication system applying transmit power control, comprising:
   a channel estimator, comprising:
      a channel state model generator;
      an input configured to obtain a measured and demodulated received uplink radio signal of a present time slot and to obtain a series of transmit power control commands configured to control a transmit power of said uplink radio signal;
      a channel estimator core, configured to estimate channel states of said present time slot by tracking said demodulated uplink radio signal with said channel state model; and
      a delay estimator, configured to estimate a delay, in units of times slots, between the time a transmit power control command is issued via the base station and the time that the transmit power control command is applied by a user equipment, said delay estimate based on the measurements of said demodulated received uplink radio signal and on the series of transmit power control commands, wherein the delay estimator is further configured to perform registration of relative powers of consecutive slots of received uplink radio signals and to correlate said relative powers to said series of transmit power control commands;
      said channel state model generator being configured to adapt channel states of said channel state model before said estimating of channel states based on a transmit power control command of said series of transmit power control commands compatible with said estimated delay.

16. The base station according to claim 15, wherein the channel estimator core is further configured to perform said tracking by use of an integrated random walk model with adaptive step length.

17. The base station according to claim 15, wherein the delay estimator is further configured to apply a phase-locked loop between said relative powers and said series of transmit power control commands, and wherein the channel estimator core is further configured to perform said tracking by use of an integrated random walk model with adaptive step length.

18. The base station according to claim 15, wherein the delay estimator is further configured to correlate said relative powers to said series of transmit power control commands for one of logarithmic relative powers and linear relative powers, and wherein the channel estimator core is based on use of Kalman filtering techniques.

\* \* \* \* \*